United States Patent [19]

Waterland, III

[11] Patent Number: 5,112,664
[45] Date of Patent: May 12, 1992

[54] SHIELDED GASKET ASSEMBLY

[75] Inventor: Alfred F. Waterland, III, Elkton, Md.

[73] Assignee: W. L. Gore & Associates, Inc., Newark, Del.

[21] Appl. No.: 620,501

[22] Filed: Nov. 30, 1990

[51] Int. Cl.⁵ .......................... B32B 3/08; F16J 15/10
[52] U.S. Cl. ........................................ 428/76; 428/68; 428/317.1; 277/228; 277/229
[58] Field of Search .................. 277/228, 229; 428/68, 428/76, 422, 317.1

[56] References Cited

U.S. PATENT DOCUMENTS 3,953,566  4/1976  Gore .
4,187,390  2/1980  Gore .
4,344,633  8/1982  Niksa .

FOREIGN PATENT DOCUMENTS 0117085  8/1984  European Pat. Off. .

OTHER PUBLICATIONS

Gore-Tex ®Gasket Tape—Industrial Sealants, Mar. 1989.

*Primary Examiner*—Alexander S. Thomas
*Attorney, Agent, or Firm*—Dena M. Weker

[57]  ABSTRACT

A shielded gasket assembly is provided for use in corrosive environments having a synthetic rubber gasket as a core and a shielding material of expanded high density polytetrafluoroethylene with an adhesive on at least one surface of the sheilding material at least partially enveloping the surface of the core gasket.

8 Claims, 6 Drawing Sheets

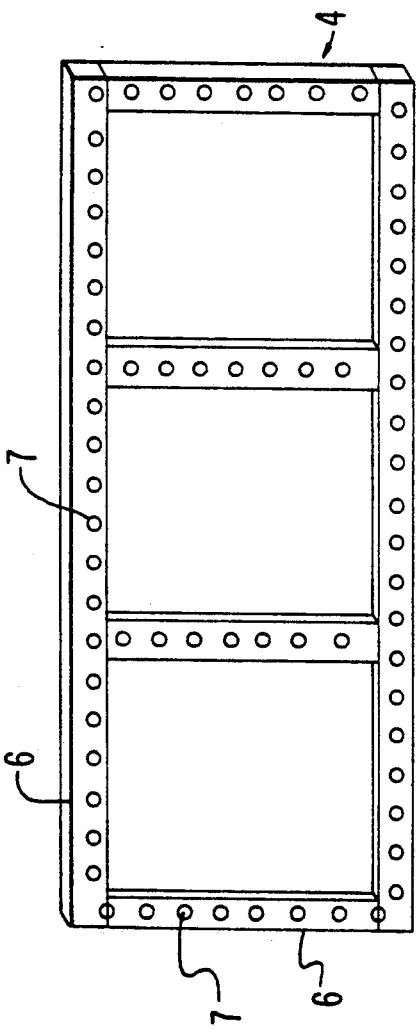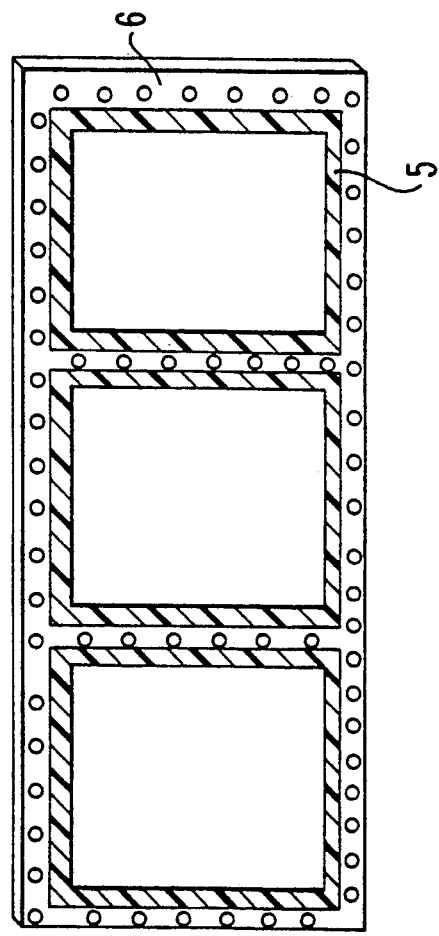

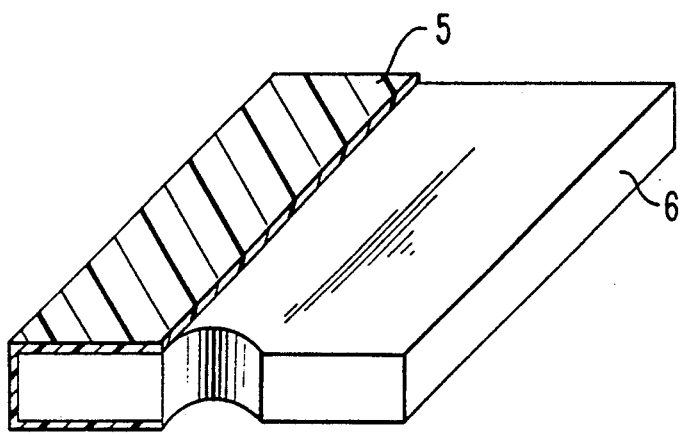
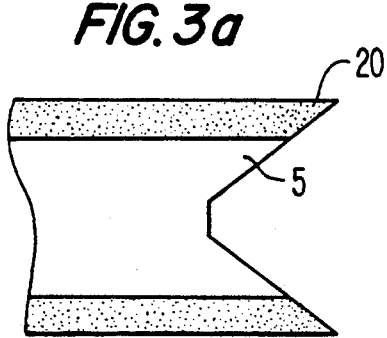
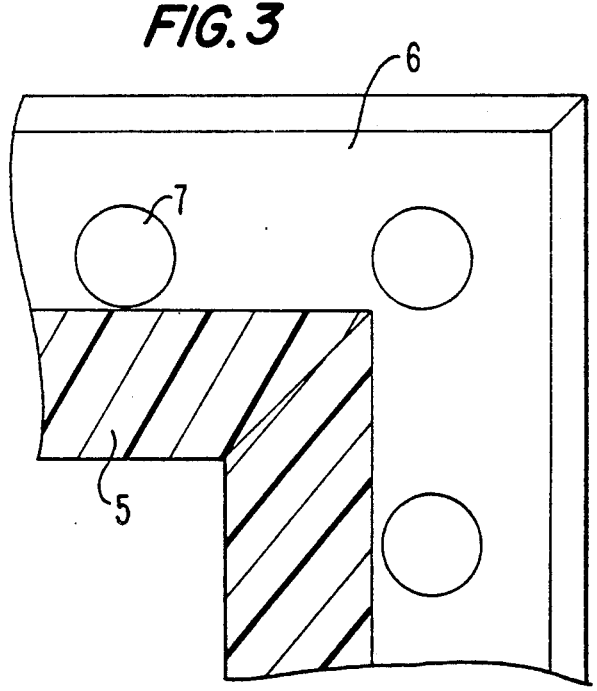

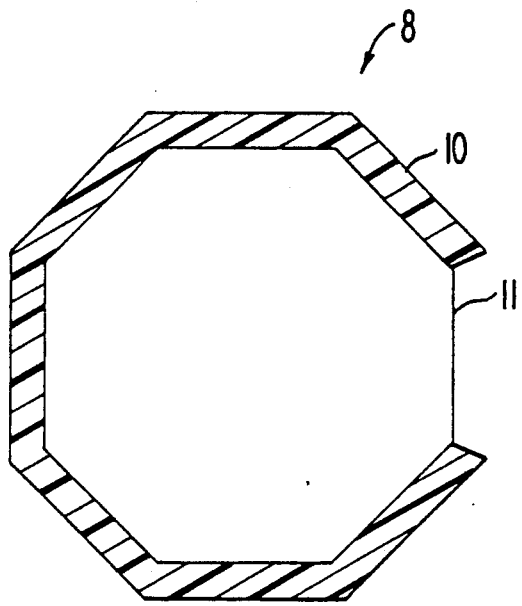
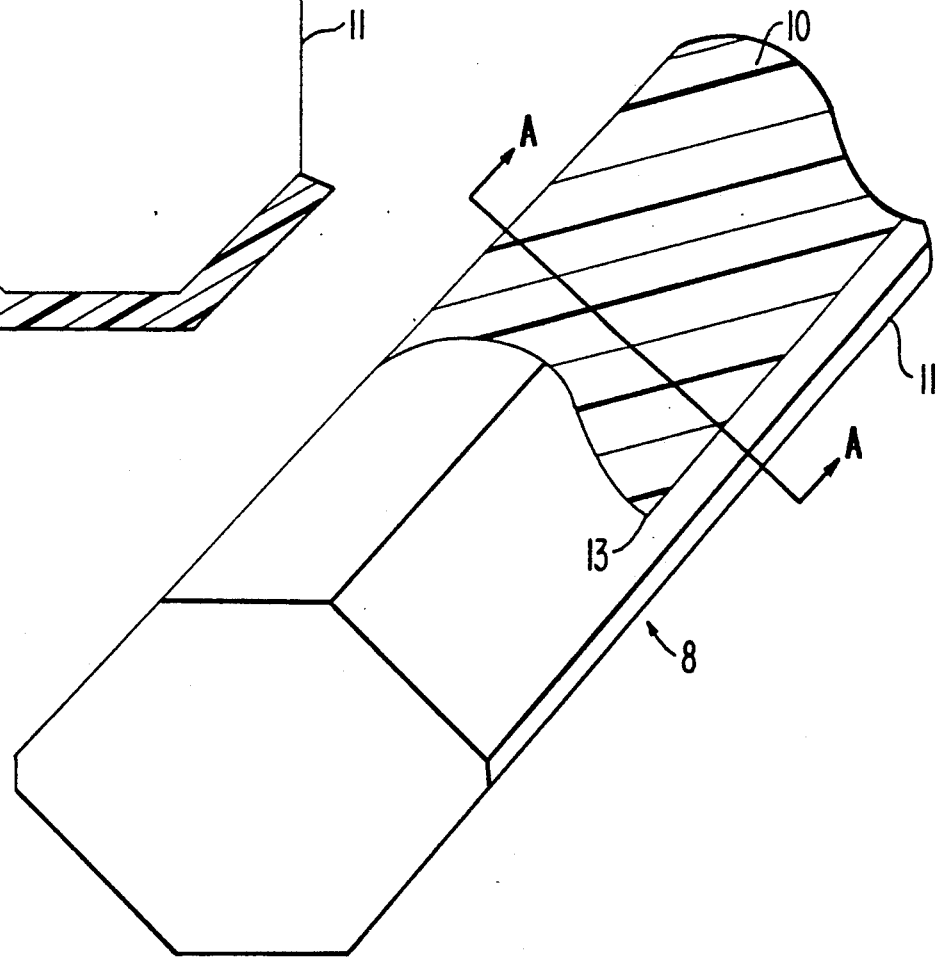

SHIELDED GASKET ASSEMBLY

FIELD OF THE INVENTION

This invention relates to a gasket assembly having a resilient core requiring chemical shielding at least partially enclosed by a high density, non-vapor permeable example polytetrafluoroethylene shield.

BACKGROUND OF THE INVENTION

Gasket materials are used in many chemically corrosive and high temperature environments leading to their constant chemical and thermal degradation and required maintenance and replacement. Such applications of these gaskets include electrolytic cells (including tank-type cells, filter press cells, and diaphragm cells), plate and frame heat exchangers and tank car dome lids.

There has been a substantial effort in both developing and commercializing gaskets that are capable of withstanding these harsh environments. Gaskets presently available for the above-mentioned applications are generally made of rubber or other synthetic materials such as ethylene-propylene-diene rubber (EPDM), Viton, or nitrile rubber because of their resiliency, conformability, and good low clamp load sealability. These gaskets operate effectively for a brief period but then rapidly deteriorate in very hot and corrosive environments. As the gaskets deteriorate, they leak and require replacement.

Efforts to improve gasket construction to enable successful long-term use in high temperature and corrosive environments have focused on the use of materials such as polytetrafluoroethylene and particularly expanded polytetrafluoroethylene because of its ability to withstand corrosive environments and high temperatures. A gasket made entirely of polytetrafluoroethylene is typically not practical however because of high costs and its mechanical properties render it impractical for use by itself as a seal in many applications.

Attempts have been made to combine a variety of materials with polytetrafluoroethylene to enhance long-term sealability in chemically corrosive environments. To date however, these efforts have resulted in products that have drawbacks and complications which limit their usefulness.

U.S. Pat. No. 4,344,633 describes a multi-layer gasket having an outboard layer of material with a hardness coefficient of 40-70% (ASTM Spec. D-395-69) in combination with a separate inboard layer of material which is corrosion resistant, non-contaminating, and stable upon contact with the cell anolyte. The inboard layer is described to be a rope or strip of low density expanded polytetrafluoroethylene "in the 'GORE-TEX' form."

There are several problems with the product described in U.S. Pat. No. 4,344,633 thereby limiting its use in sealing applications with electrolytic cell parts. Equipment must be specifically designed to employ this two-part gasket as the flange of the cell must be wide enough to support the inboard barrier seal. Also, the inboard barrier seal is comprised of low density expanded polytetrafluoroethylene which provides a liquid tight seal but is still permeable to corrosive vapors that pass through the barrier seal to attack the rubber seal.

European Patent Application 0117085 describes a method of bonding a layer of fluoropolymeric material to the surface of an organic polymer material. The preferred fluoropolymeric material is expanded and of low density form and is most preferably expanded polytetrafluoroethylene. The process described in the application includes placing the expanded low density fluoropolymer into a mold, charging an organic polymer to the mold so that is contacts the fluoropolymer and subjecting them both to elevated temperatures and pressures so that a bond is created. Similar to U.S. Pat. No. 4,344,633, these gaskets utilize low density expanded polytetrafluoroethylene which is permeable to corrosive vapors and gases when there is insufficient compression along all points of the gasket.

Additional problems with the above-mentioned references include the shim effect created by the construction of a separate polymeric material causing incomplete densification of the low density expanded polytetrafluoroethylene. If the expanded polytetrafluoroethylene is not compressed to above a density of 1.7 g/cc, it will be permeable to corrosive vapors and therefore not function properly.

A separate barrier material will allow leakage past it during vibration and thermal cycling when load—unload conditions exist.

Also a problem exists with the above described reference when the polytetrafluoroethylene fails to match exactly the conformation of the elastomer which may result in leakage and attack of the elastomer.

SUMMARY OF THE INVENTION

A shielded gasket assembly is provided for use in corrosive gaseous and liquid environments having a synthetic rubber gasket as a core and a shielding material of expanded high density polytetrafluoroethylene with an adhesive on at least one surface of said shielding material at least partially enveloping the surface of the rubber gasket and bonding thereto. The shielded gasket assembly may also be comprised of a synthetic rubber gasket core which is fully enclosed by expanded, high-density polytetrafluoroethylene, preferably having a density greater than 1.7 g/cc. The synthetic rubber gasket core may be made from a molding of EPDM, Viton, neoprene, gum rubber, neoprene butadiene rubber (NBR), silicone butadiene rubber (SBR) and silicone. These shielded gasket assemblies may be used with tank-type electrolysis cells, sodium chlorate cells, plate and frame heat exchangers and tank car dome lids.

BRIEF DESCRIPTION OF THE DRAWINGS

FIG. 2 shows a front view of the shielded cathode cover gasket comprising the core gasket shown in FIG. 2a and the shield.

FIG. 2a shows a view of core gasket for a tank type sodium chlorate cell.

FIG. 2b a sectional perspective of the core gasket surrounded by the shielding material.

FIG. 3 shows a corner section of the core gasket with shielding material having a mitered corner edge.

FIG. 3a shows the backside of the shielding material and adhesive to be used on the core gasket corner.

FIG. 5 shows a schematic view of a plate and frame heat exchanger gasket and location of shield.

FIG. 5a shows a cross-sectional view of the shielded gasket along line A—A of FIG. 5.

DETAILED DESCRIPTION OF PREFERRED EMBODIMENTS

Figure 1:
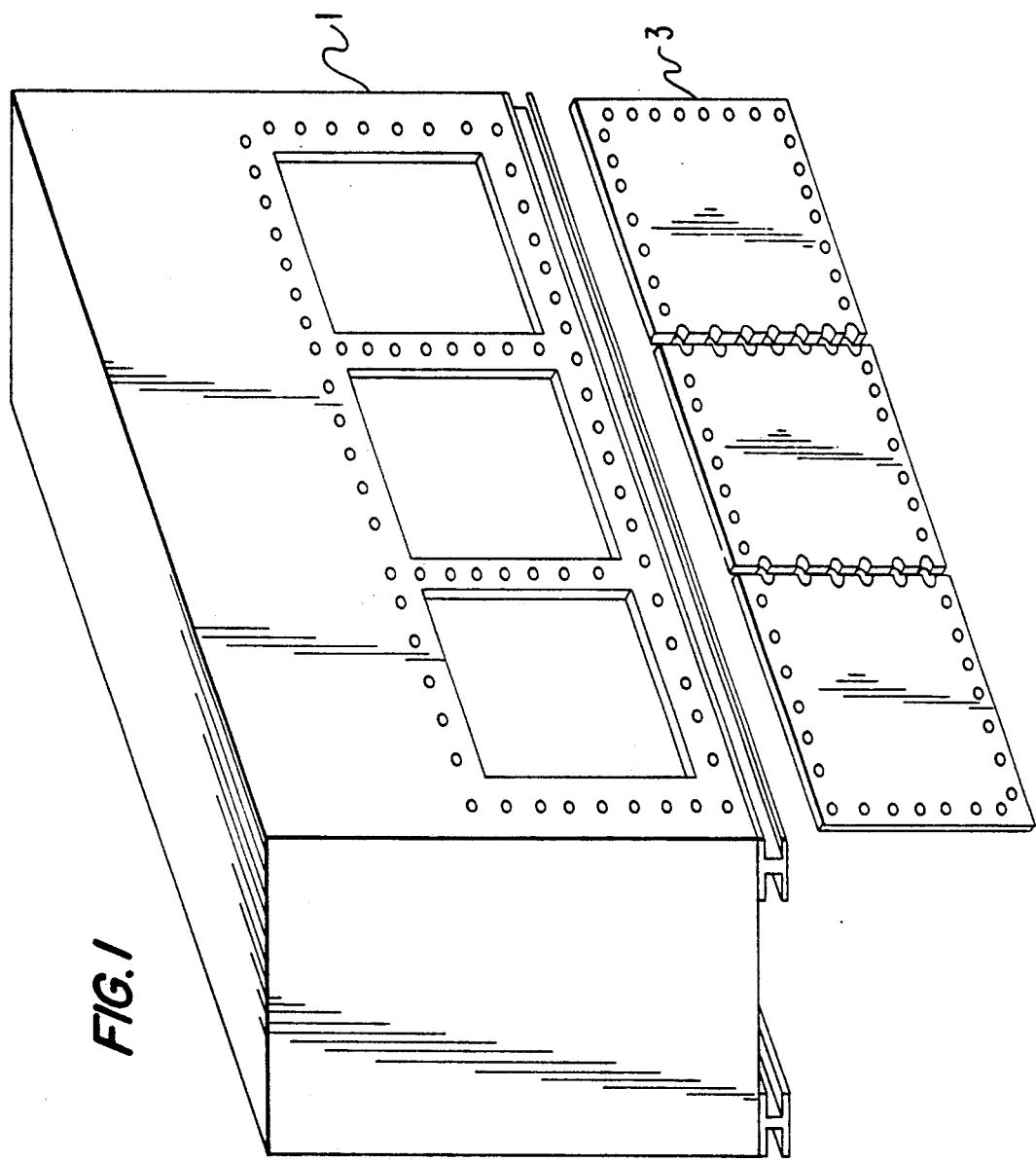
FIG. 1 shows a schematic of a sodium chlorate cell, cathode cover, and position of the shielded cathode cover gasket.

The present invention relates to an improved gasket having a shielding material designed to at least partially enclose resilient synthetic rubber gaskets so that the gasket retains its resiliency and achieves complete isolation from chemical attack. This improved gasket has a multitude of applications including but not limited to tank-type electrolysis cells, plate and frame heat exchangers, tank car dome lids, and filter presses where resilient, chemically inert gaskets are required for long-term, durable performance.

The shielding material used in the improved gasket is preferably low density expanded polytetrafluoroethylene that has been further processed. The low density expanded polytetrafluoroethylene is preferably made in accordance with the teachings of U.S. Pat. Nos. 4,187,390 and 3,953,566. A most preferable precursor material is GORE-TEX ® gasket tape commercially available from W. L. Gore & Associates, Inc., of Newark, Del. The precursor material of low density polytetrafluoroethylene having a density of about 0.2 to 1.0 g/cc is impermeable to some corrosive liquids but is permeable to corrosive gases. In this invention, the low density expanded polytetrafluoroethylene is further processed so that the final shield material has a density between about 1.7 to 2.1 g/cc. This processing may be performed by compression such as by mechanically rolling the porous material preferably between calendaring rolls with or without the presence of heat. Other means of compressing or densifying the low density expanded polytetrafluoroethylene may also be used. By increasing the density to an optimum of 2.1 g/cc the material is rendered impermeable to corrosive gases and vapors as well as the corrosive liquids.

The core gasket may be constructed of any commercial gasket available, however, preferable gasket materials include resilient synthetic materials such as rubber, EPDM, Viton, or silicone. Adhesives that are useful with the gasketing system include acrylic, rubber, and silicone.

Significant advantages are achieved by utilization of highly densified expanded polytetrafluoroethylene including the ability of adhesive systems to adhere to the polytetrafluoroethylene material without the necessity of chemically etching the polytetrafluoroethylene. The use of densified expanded polytetrafluoroethylene also decreases the risk of degradation of the synthetic rubber seal. In addition, no modification need be made to existing sealing surfaces as the shield does not require additional space or strength of the sealing surface. Finally, the shielding material may be applied to many surfaces of the core gasket such as the top, bottom, and exposed inner surface to protect against degradation.

This invention is particularly beneficial over existing gaskets because of the ease in manufacture and effective combination of resiliency and chemical inertness. The shielded gasket is simple to assemble either in a manufacturing facility or in the field as the construction does not require molding under pressure and temperature, and does not require any chemicals to cure. Etchants are not required to affix the polytetrafluoroethylene to the core gasket. Dimensions of flange width and component compression analysis of the cell are also not critical. The shielded gasket can readily be employed on all existing jointing designs.

The invention is best understood by reference to the accompanying examples and drawings.

EXAMPLE 1—SHIELDED GASKET IN SODIUM CHLORATE CELL

FIG. 1 is a schematic perspective of a tank-type sodium chlorate cell showing tank 1 and cathode cover 3. The shielded gasket shown in FIG. 2 is located on the outer surface of tank 1 so that it is positioned between the tank and inner surface of the cover 3. The core gasket 4 for this particular embodiment, shown in FIG. 2a, consists of six members 6 of two-inch wide by one-quarter inch thick 70-A durometer EPDM strips arranged in a triple picture frame configuration. Alternatively, but not shown, the triple picture frame could be constructed from one piece of EPDM. The members 6 were bonded together with a commercially available adhesive. Holes 7 were punched in the core gasket that coincide with the location of the bolts located on the cathode cover.

Strips of expanded porous polytetrafluoroethylene 5 made in accordance with the teachings of U.S. Pat. No. 3,953,566 were further processed by application of mechanical pressure to render them substantially impermeable to vapors and gases as well as liquids. The strips 5 were cut to required dimensions to cover the internal exposed edge, top, and bottom of the core EPDM gasket. The final thickness of the polytetrafluoroethylene strips was 0.013 inches; the density was 2.0 g/cc. Pressure sensitive adhesive was applied to one surface of the polytetrafluoroethylene to adhere to the core gasket. As shown in FIG. 2b, the polytetrafluoroethylene strips 5 were designed so that they cover the inside exposed edge, the top, and bottom of the core members along the inner edges up to the location of the bolt holes 7. The strips of polytetrafluoroethylene were applied to all exposed surfaces of the core members 6 where exposure to corrosive materials may occur.

FIG. 3 shows a polytetrafluoroethylene shield applied to a corner of the core gasket members 4, in which the shield covers the member up to the site of the bolt holes. The embodiment of FIG. 3 shows a mitered cut and joint between two sections. FIG. 3a shows the backside of the shield tape in which there is a mitered cut that folds around a corner member and the adhesive strip 20 that joins the shield 5 to the member 6.

Figure 4A:
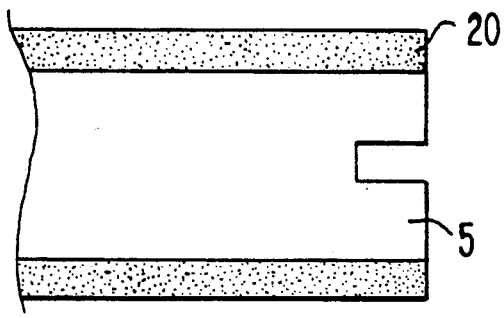
FIG. 4a shows the backside of the shielding material and adhesive used on the core gasket of FIG. 4.
Figure 4:
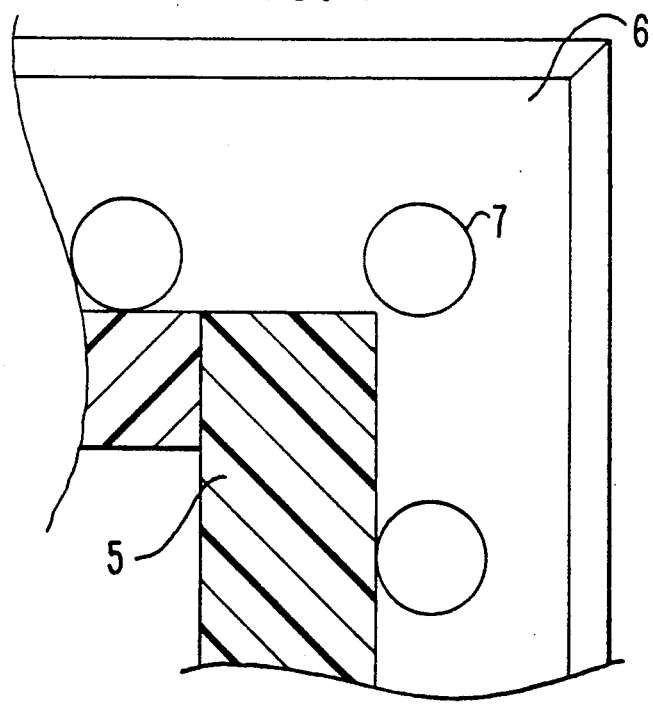
FIG. 4 shows a corner section of the core gasket with shielding material having a longitudinally joined corner.

Alternatively FIGS. 4 and 4a show the polytetrafluoroethylene shield strips 5 adjoined perpendicularly. The adhesive strips 20 join the shield 5 to the members 6. Particular care if given so that a close contact of shield parts is made to limit the possibility of a chemical attack of the unshielded core gasket 4.

After all exposed edges of the core gasket 4 are covered, the shielded gasket is placed into position on the electrolytic cell tank between the tank 1 and covers 3. The covers 3 are placed into position and the bolts installed and tightened to create and reinforce a seal. The cell, equipped with the shielded gasket ran at 70° C. for over 400 days. The corrosive mixtures contacting the gasket during the cell operation included sodium hypochlorite, sodium chlorate, and sodium chloride.

After the period of operation, there was no gasket deterioration, cell leakage, or signs of chemical attack to either the polytetrafluoroethylene shield or the core gasket of EPDM.

Conventional practice using a standard EPDM gasket without the polytetrafluoroethylene shield in a triple window frame resulted in deterioration of the gasket that had been in contact with the corrosive liquids within four weeks of service. This deterioration resulted in visible leakage.

EXAMPLE 2—SHIELDED GASKET IN A HEAT EXCHANGER

FIG. 5 shows a schematic perspective of a section of a gasket for use in a plate and frame heat exchanger. FIG. 5a shows a cross section of the gasket along line A—A. For this application, an octagonal shaped core gasket 8 of 70-A durometer molded EPDM was used to provide a seal between adjacent titanium plates of a plate and frame heat exchanger. Although the core gasket shown in FIGS. 5 and 5a are octagonal in shape, it should be recognized by one skilled in the art that a variety of shapes may be used. Therefore, it is intended that this invention not be limited by the shape of the gasket.

A length of expanded polytetrafluoroethylene shield material constructed by the method and teachings described in Example 1 was selected as the shield material 10 to envelope seven of the eight sides of the core gasket. A more complete enclosure of the EPDM gasket was required in a plate and frame heat exchanger application as compared to that described in Example 1 because of the increased potential for exposure of the basket surface to the corrosive liquids inside the exchanger. Because of the complexity of the plate and frame heat exchanger gaskets, a thinner less rigid polytetrafluoroethylene shield was required for ease in installation. The thickness of the shield material used in this application was 0.010 inches and density was 1.8 g/cc.

Figure 6:
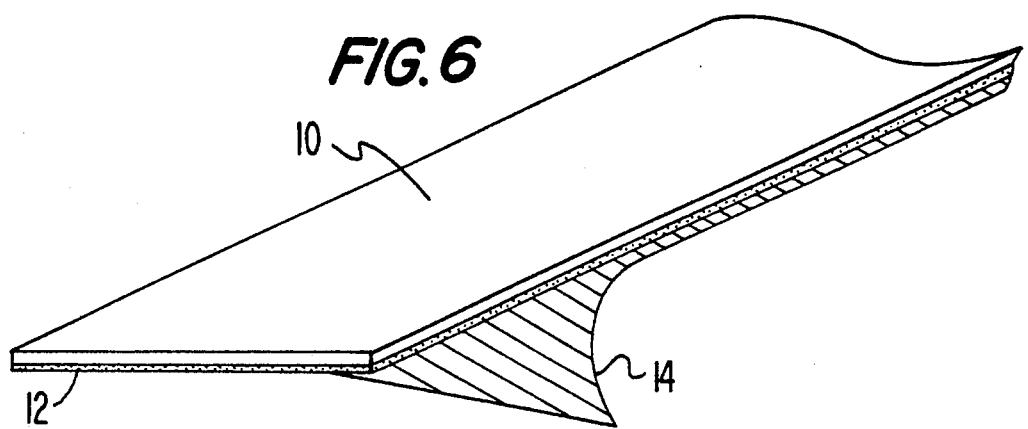
FIG. 6 shows a perspective view of the shield material.

FIG. 6 shows a perspective view of the shield material to be used with the EPDM gasket.

A layer of a commercial acrylic pressure sensitive adhesive 12 was applied to one entire surface of the polytetrafluoroethylene shield 10. A protective release paper 14 was removed upon application. A perspective view of the polytetrafluoroethylene shield 10, adhesive 12 and protective release paper 14 is shown in FIG. 4.

Figure 6A:
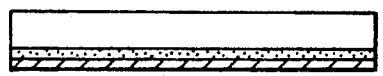
FIG. 6a shows a cross-sectional view of one embodiment of the shield material.
Figure 6B:
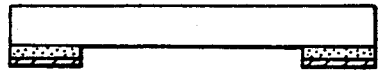
FIG. 6b shows a cross-sectional view of a second embodiment of the shield material.

FIGS. 6a and 6b show cross-sectional views of two embodiments of the polytetrafluoroethylene shield. FIG. 6b shows a cross-section of an embodiment where the adhesive is applied to an entire surface of the polytetrafluoroethylene material. Alternatively, FIG. 6b shows a cross-section of the shield where the adhesive is applied to only the edges of one surface of the polytetrafluoroethylene.

Referring back to FIGS. 5 and 5a, the polytetrafluoroethylene shield material 10 was applied to all surfaces of the core gasket except one outer surface 11 which was exposed to allow for deflections of the core gasket. The shield material was applied along the entire length of the core gasket with the adhesive bonding the shield material to the core gasket. The shield material was applied such that the leading inside edge of the gasket contacted the center of the shield tape and the outer edges of the shield tape were folded across the top and bottom face of the core gasket and adhered to the back trailing edge of the gasket. The shield material was applied around the entire periphery of the core gasket. The two ends of the shield material were overlapped with each other.

The shield material was wrapped tightly around the gasket to prevent buckling of the shield and to ensure sealability. The shield material however was not wrapped so tightly so as to distort the shape of the core gasket. The seam of the shield material was placed at the outside trailing edge as designated by 13 in FIG. 5 so that in case the seam of the shield material opened due to deformation of the core gasket, there would be no contact between it and corrosive liquids.

After shielded gasket was constructed, the assembly was installed between two plates of a 79-plate exchanger. For this evaluation, the standard commercially available gaskets molded from Vitone® and sixty-eight standard commercially available gaskets molded from EPDM were installed between the remaining plates.

Once assembled, the exchanger was put into service. Corrosive liquids at 77° C. including ammonia, bensene, xylene, toluene, and naphthalene were cooled in the exchanger with 10° C. cooling water at a discharge pressure of 40 psig. The exchanger operated under these conditions for fifty-four days. The exchanger was taken off line and the gaskets were removed and inspected. The shielded gasket of polytetrafluoroethylene and EPDM showed no visible sign of degradation. The Viton and EPDM gaskets had been severely attacked and had been degraded to the point of leaking.

While the invention has been disclosed in terms of certain embodiments and detailed description, it will be clear to one skilled in the art that modifications or variations of such details may be made without deviating from the scope of the invention.

I claim:

1. A shielded gasket assembly for use in corrosive gas and liquid environments comprising a core gasket of a synthetic rubber and a shielding material of high density non-vapor permeable expanded polytetrafluoroethylene having an adhesive on at least one side of said shielding material at least partially enveloping the surface perimeter of said core gasket and adhesively bonding said shielding material to said core gasket.

2. A shielded gasket assembly as described in claim 1 wherein said shielding material fully envelopes the surface area of said core gasket.

3. A shielded gasket seal assembly as described in claim 1 wherein said core gasket is made from synthetic rubber selected from the group consisting of EPDM, Viton, neoprene, gum rubber, NBR, SBR, and silicone.

4. A shielded gasket assembly as described in claim 1 wherein the shielding material of expanded polytetrafluoroethylene has a density greater than 1.7 g/cc.

5. A shielded gasket assembly as described in claim 1 for use in tank-type electrolysis cells.

6. A shielded gasket assembly as described in claim 1 for use in sodium chlorate cells.

7. A shielded gasket assembly as described in claim 1 for use in plate and frame heat exchangers.

8. A shielded gasket assembly as described in claim 1 for use in tank car dome lids.

* * * * *